United States Patent
Mehaffy et al.

(10) Patent No.: US 8,010,948 B2
(45) Date of Patent: *Aug. 30, 2011

(54) SYSTEM AND METHOD FOR MEASURING LATCH CONTENTION

(75) Inventors: David William Mehaffy, Austin, TX (US); James William Van Fleet, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 967 days.

This patent is subject to a terminal disclaimer.

(21) Appl. No.: 11/935,371

(22) Filed: Nov. 5, 2007

(65) Prior Publication Data

US 2008/0059673 A1   Mar. 6, 2008

Related U.S. Application Data

(63) Continuation of application No. 10/798,905, filed on Mar. 11, 2004, now Pat. No. 7,318,220.

(51) Int. Cl.
*G06F 9/44* (2006.01)
(52) U.S. Cl. .................. 717/127; 717/128; 710/200
(58) Field of Classification Search .................. None
See application file for complete search history.

(56) References Cited

U.S. PATENT DOCUMENTS

| 5,502,840 | A  | * | 3/1996  | Barton ........................... 710/200 |
| 5,968,157 | A  | * | 10/1999 | Joy et al. ....................... 710/200 |
| 6,338,159 | B1 | * | 1/2002  | Alexander et al. ............. 717/128 |
| 6,850,938 | B1 | * | 2/2005  | Sadjadi .............................. 1/1 |

* cited by examiner

*Primary Examiner* — Lewis A Bullock, Jr.
*Assistant Examiner* — Michael Yaary
(74) *Attorney, Agent, or Firm* — Van Leeuwen & Van Leeuwen; Matthew B. Talpis (57) ABSTRACT

A system and method is provided for measuring lock usage in a non-intrusive manner. Measurements are performed only when a lock is contended. When a lock is requested and the lock is available (i.e., is not contended), the only data gathered is a counter that is incremented to keep track of the number of times the particular lock was requested. When a lock is contended, an operating system trace hook is requested. The trace hook records data such as the timestamp that the requester requested the lock, the request count, a stack traceback to identify the function corresponding to the requester, and the address of the lock that was requested. Post-operative processing analyzes the recorded trace hook data to identify contended locks and processes that may not be efficiently using locks.

11 Claims, 7 Drawing Sheets

SYSTEM AND METHOD FOR MEASURING LATCH CONTENTION

RELATED APPLICATIONS

This application is a continuation application of U.S. Non-Provisional patent application Ser. No. 10/798,905, entitled "System and Method for Measuring Latch Contention," filed on Mar. 11, 2004 now U.S. Pat. No. 7,318,220.

BACKGROUND OF THE INVENTION

1. Technical Field

The present invention relates in general to a system and method for measuring usage of software locks in a non-intrusive manner. More particularly, the present invention relates to a system and method that collects lock information when a lock is contended with minimal or no impact on a lock when the lock is available.

2. Description of the Related Art

The operating systems and large applications are important programs that run on a computer. Every general-purpose computer has an operating system in order to run other programs. Operating systems perform basic tasks, such as recognizing input from the keyboard, sending output to the display screen, keeping track of files and directories, and controlling peripheral devices such as disk drives and printers. Important applications, such as database systems, provide services that are often used by many other applications. Operating systems and applications have many resources, such as files, data structures, and other components that are shared amongst many programs (i.e., threads) that are running simultaneously in the system.

Many operating systems and applications manage shared resources, such as files, data structures, and devices, using software latches, also known as "locks." Software locks prevent multiple processes from each altering a storage area at almost the same time resulting in a corrupted storage value. Software locks include simple locks and complex locks. Simple locks allow one process to access the shared resource at a given time. Complex locks, on the other hand, allow either one writer or multiple readers to access the shared resource simultaneously. As the name implies, simple locks are generally simpler to implement and, as a result, are typically faster because shared resources that cannot benefit from the ability to support multiple simultaneous readers.

Conversely, complex locks are more expensive (in terms of processing requirements) than simple locks and are slow when the number of writers is great in comparison with the number of readers. However, complex locks offer a performance advantage in situations where larger numbers of processes request to read a shared resource in comparison with the number of processes requesting to update the resource. By allowing multiple readers simultaneously, complex locks can typically dispose of large numbers of readers faster than simple locks.

Processes have priorities that determine their relative accessibility to a processor. When a lower priority thread owns a lock which a higher-priority thread is attempting to acquire, the owner has its priority promoted to that of the most favored thread waiting for the lock. When the owner releases the lock, its priority is restored to its normal value. Priority promotion ensures that the lock owner can run and release its lock, so that higher priority processes or threads do not remain blocked on the lock.

Complex locks are read-write locks which protect thread-thread critical sections. Complex locks may be preemptable, meaning that a kernel thread can be preempted by another, higher priority kernel thread while it holds a complex lock. Complex locks can also be spin locks; a kernel thread which attempts to acquire a complex lock may spin (busy-wait: repeatedly execute instructions which do nothing) if the lock is not free.

One challenge with the prior art is understanding the contention for shared resources. One approach to this challenge is measuring lock usage to determine how threads are using the locks. A challenge of this approach, however, is that the process of measuring lock usage often greatly impacts system performance as metric information is recorded for each lock that is requested and acquired.

What is needed, therefore, is a system and method for measuring lock usage only when there is true contention for the lock. In this manner, intrusiveness of measuring and monitoring lock usage is minimalized and overall system performance is not unduly impacted by the measurement process.

SUMMARY

It has been discovered that the aforementioned challenges are resolved with a system and method that measures lock usage only when a lock is truly contended and does not perform significant measuring operations when the lock is not contended (i.e., the lock is immediately available to the requester). Collecting data when a lock is contended does not significantly reduce overall system performance because lock contention processing needs to be performed anyway. However, by gathering minimal data when a lock is readily available, overall system performance is improved over other systems designed to gather lock data.

When a lock is requested, a determination is made as to whether the lock being requested is available. If the lock is available, the only data gathered is a counter that is incremented to keep track of the number of times the particular lock was requested. However, data regarding the identity of the requesting process (i.e., thread) and the amount of time the thread held the lock is not gathered. In addition, the counter is incremented in parallel with other operations that are normally performed when a lock is acquired. For example, the counter can be incremented while the lock manager software is updating data structures that are used to set the owner of the lock to the requesting process.

When a lock is already contended, an operating system trace hook is issued. The trace hook writes data such as the timestamp that the requester requested the lock, an identifier corresponding to the requester, the address of the lock that was requested, and the stack tracebacks that indicate which other functions have requested the lock. When the lock is acquired, the operating system records a second timestamp, the address of the lock that has now been acquired, and the identifier corresponding to the requester that has now acquired the lock. Finally, when the thread releases the lock, a third timestamp is recorded by the operating system along with the identifiers corresponding to the lock, the thread, and stack tracebacks that indicate the function which released the lock.

Measurement of lock contention is performed for a period of time, perhaps running a series of test cases or scripts. The result of the measurement is lock usage data that includes the number of times each lock was requested and detailed data for each time the locks were contended. Post-operative processing analyzes the usage data and identifies the number of times each lock was requested and contended ("misses"), how long threads had to spin to acquire locks, how long the various threads held the locks, how many times the locks were successfully acquired, the ratio of lock contentions versus successful acquisitions. In addition, post-operative processing identifies which functions are causing contention in the system. These functions can then be analyzed and modified so that the functions use the locks in a more efficient manner.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
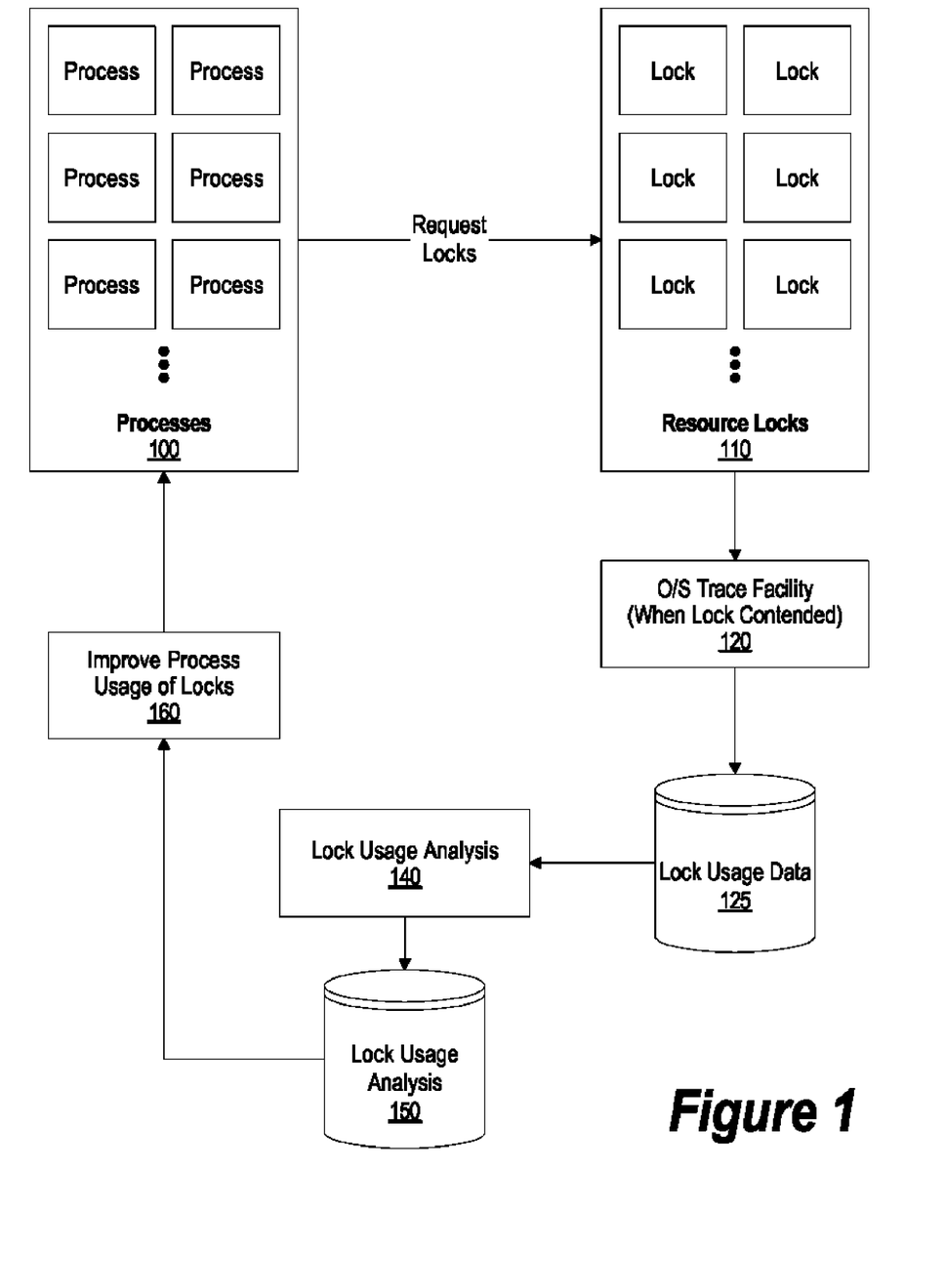
FIG. 1 is a system diagram of usage data being collected during lock contention and used in post-operative processing to improve the processes' usage of the locks.

FIG. 1 is a system diagram of usage data being collected during lock contention and used in post-operative processing to improve the processes' usage of the locks. Processes 100 are processes in an operating system that request locks 110 that control access to various resources in order to perform various processes. When resource locks are contended, operating trace facility 120 is invoked in order to trace various data items related to the requesting process and the locks being requested.

After the operating system trace facility has gathered data during lock contentions, lock usage data 125 is analyzed using lock usage analysis process 140 that identifies the number of times each lock was requested and contended ("misses"), how long threads had to spin to acquire locks, how long the various threads held the locks, how many times the locks were successfully acquired, the ratio of lock contentions versus successful acquisitions. In addition, lock usage analysis process 140 identifies which processes from processes 100 are causing contention in the system. The results of lock usage analysis process 140 is a lock usage analysis report 150 which is analyzed in order to improve processes usage of the locks. A programmer or system designer reads the lock usage analysis report in order to improve the processes' usage of the locks (step 160). The improvements are made by programmers or system designers modifying one or more of processes 100 in light of the lock usage analysis so that the processes use the locks more efficiently.

Figure 2:
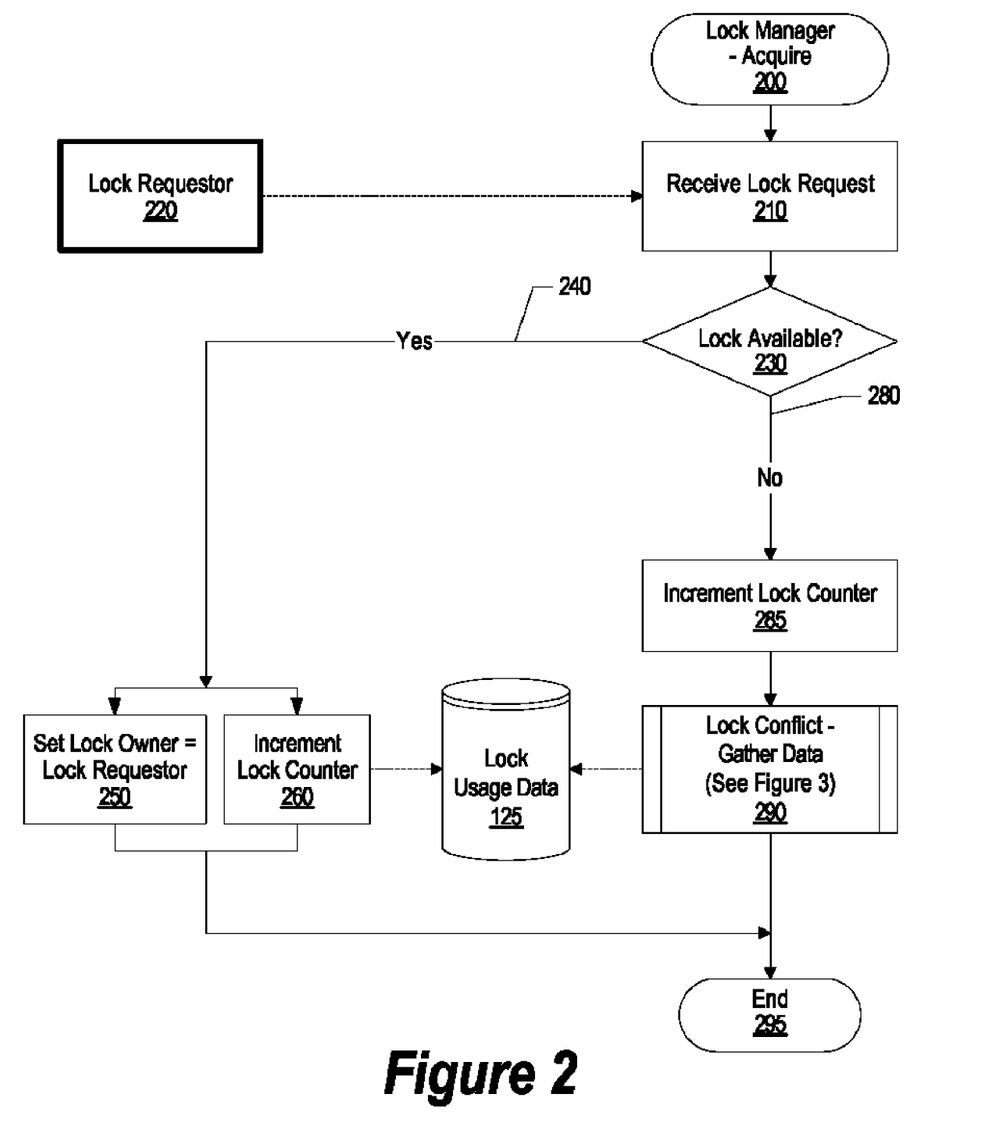
FIG. 2 is a flowchart showing the steps taken by a lock manager to handle a lock request including steps taken to gather lock usage data.

FIG. 2 is a flowchart showing the steps taken by a lock manager to handle a lock request including steps taken to gather lock usage data. Processing commences at 200 whereupon, at step 210, lock requester process 220 requests a lock.

A determination is made as to whether the lock is available (decision 230). In other words, a determination is made as to whether the lock is contended because another process has already acquired the lock. If the lock is available (i.e., another process has not already acquired the lock), decision 230 branches to "yes" branch 240 whereupon the lock owner is set to the requesting process' identifier (step 250). In parallel with the instructions used to set the lock ownership, a lock counter is incremented (step 260) and stored in lock usage data 125. In this manner, when the lock is available, no additional time is spent in giving the lock to the requesting processes. After the lock ownership has been set and the lock counter has been incremented, lock acquisition processing ends at 295.

Figure 3:
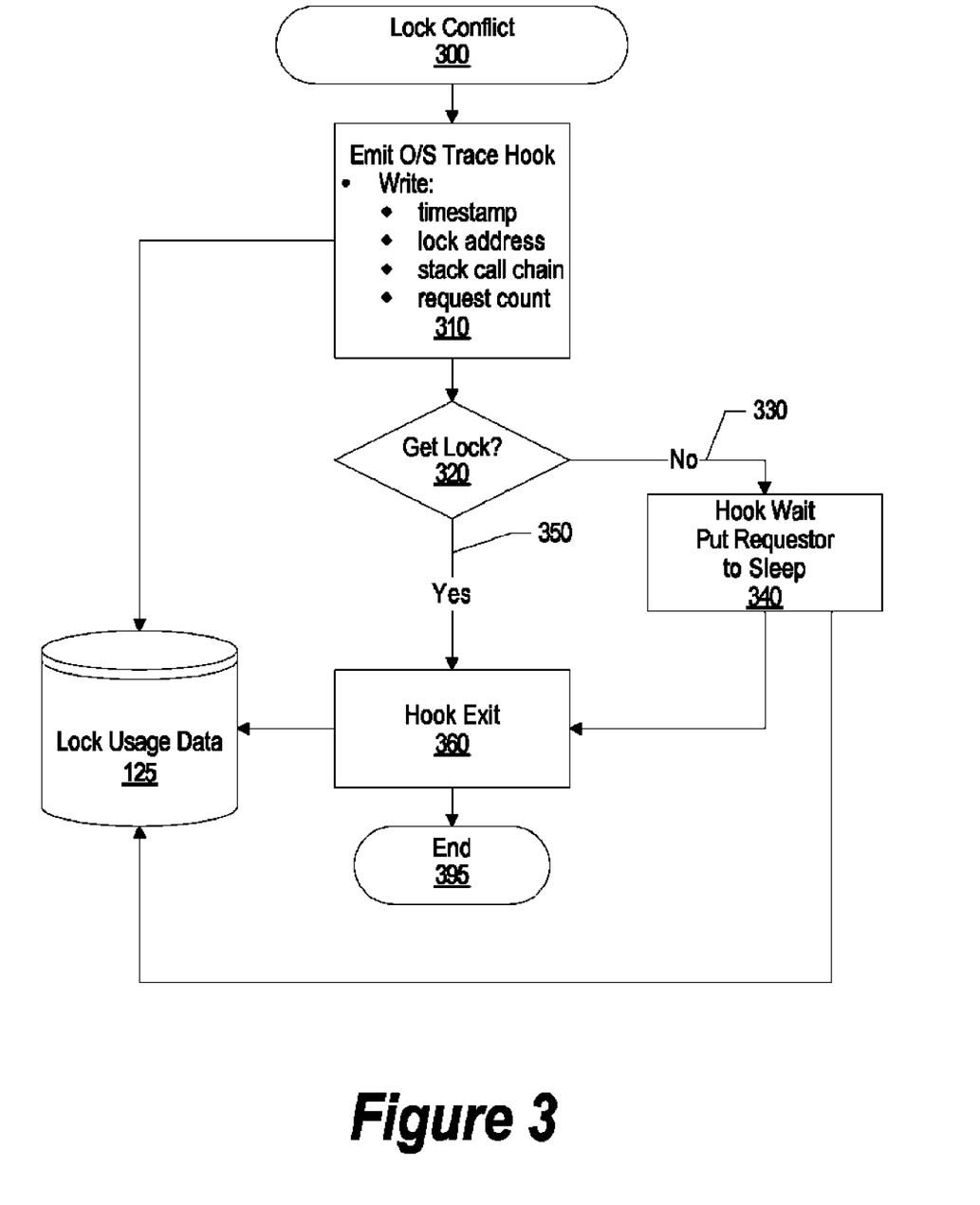
FIG. 3 is a flowchart showing steps taken by the lock manager when a lock conflict arises.

Returning to decision 230, if the lock is not available (i.e., another process has already acquired the lock and has not yet released it), decision 230 branches to "no" branch 280 whereupon lock conflict processing occurs during which data is gathered regarding the lock including incrementing the lock counter at 285 and the requesting process (predefined process 290, see FIG. 3 and corresponding text for processing details). Lock acquisition processing then ends at 295.

FIG. 3 is a flowchart showing steps taken by the lock manager when a lock conflict arises. Processing commences at 300 whereupon, at step 310, the lock conflict code emits an operating system trace hook request that records the current time of day timestamp, the identifier of the lock being requested, the request count, and the stack call chain that includes the identity of the function currently requesting the lock.

In one embodiment, the requesting process will enter a spin loop for a period of time rather than immediately putting the requesting process to sleep. This is done because considerable processing resources are needed to put the requesting process to sleep and to subsequently wake the process up. In addition, putting the process to sleep will typically slow down the requesting process more than the process will be slowed by entering a short spin loop.

A determination is made as to whether the requesting process was able to acquire the lock during this time period (decision 320). If the requesting process did not acquire the lock, then decision 320 branches to "no" branch 330 whereupon, at step 340, the a wait trace hook is issued and requesting process is put to sleep. On the other hand, if the requesting process acquired the lock, then decision 320 branches to "yes" branch 350 bypassing step 340.

When the requesting process acquires the lock, either with or without being put to sleep, a hook exit process (step 360) is performed which writes additional data to lock usage data 125 pertaining to the requesting process' acquisition of the lock. In one embodiment, the hook exit code is automatically performed by the operating system when the process acquires the lock in response to the hook trace being requested at step 310. Processing thereafter ends at 395.

Figure 4:
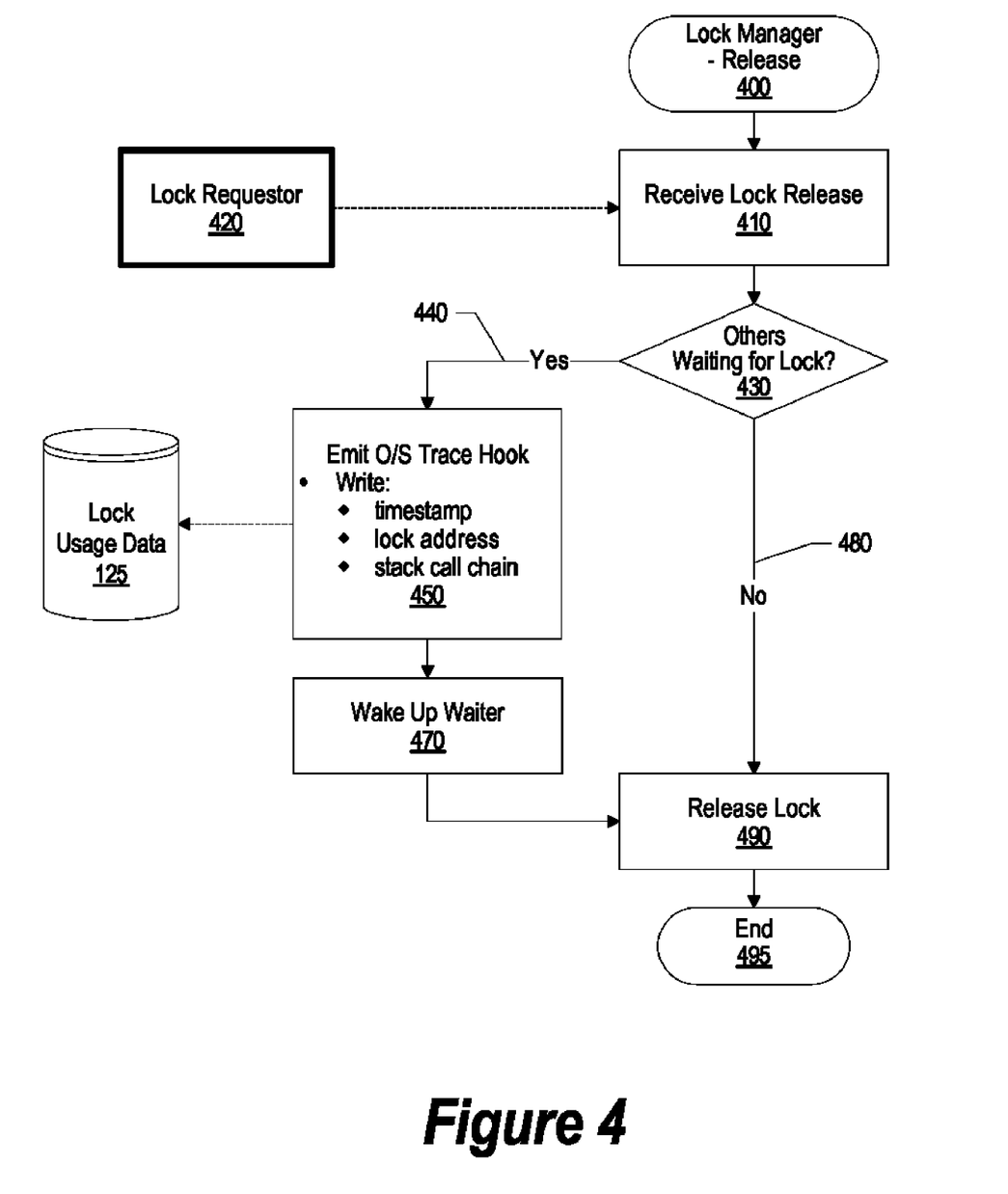
FIG. 4 is a flowchart showing steps taken by the lock manager when a lock is released.

FIG. 4 is a flowchart showing steps taken by the lock manager when a lock is released. Processing commences at 400 when, at step 410, the lock manager receives a release request (or notification) from requesting process 420 when the requesting process is finished using the resource controlled by the lock.

A determination is made as to whether there are other processes waiting for the lock (decision 430). If there are other processes waiting for the lock, decision 430 branches to "yes" branch 440 whereupon, at step 450, a trace hook is emitted that writes the current timestamp, the address of the lock being requested, and the stack call chain. The trace data is written to lock usage data 125. At step 470, processing wakes up one of the processes that is currently waiting for the lock (the process that is woken up might be able to acquire the lock so long as another process does not acquire the lock between the time that the lock is released and the process that was awoken is able to request the lock). On the other hand, if there are no other processes waiting to acquire the lock, decision 430 branches to "no" branch 480 bypassing steps 450 and 125.

At step 490, the lock is released. Thereafter, the lock manager's release processing ends at 495.

Figure 5:
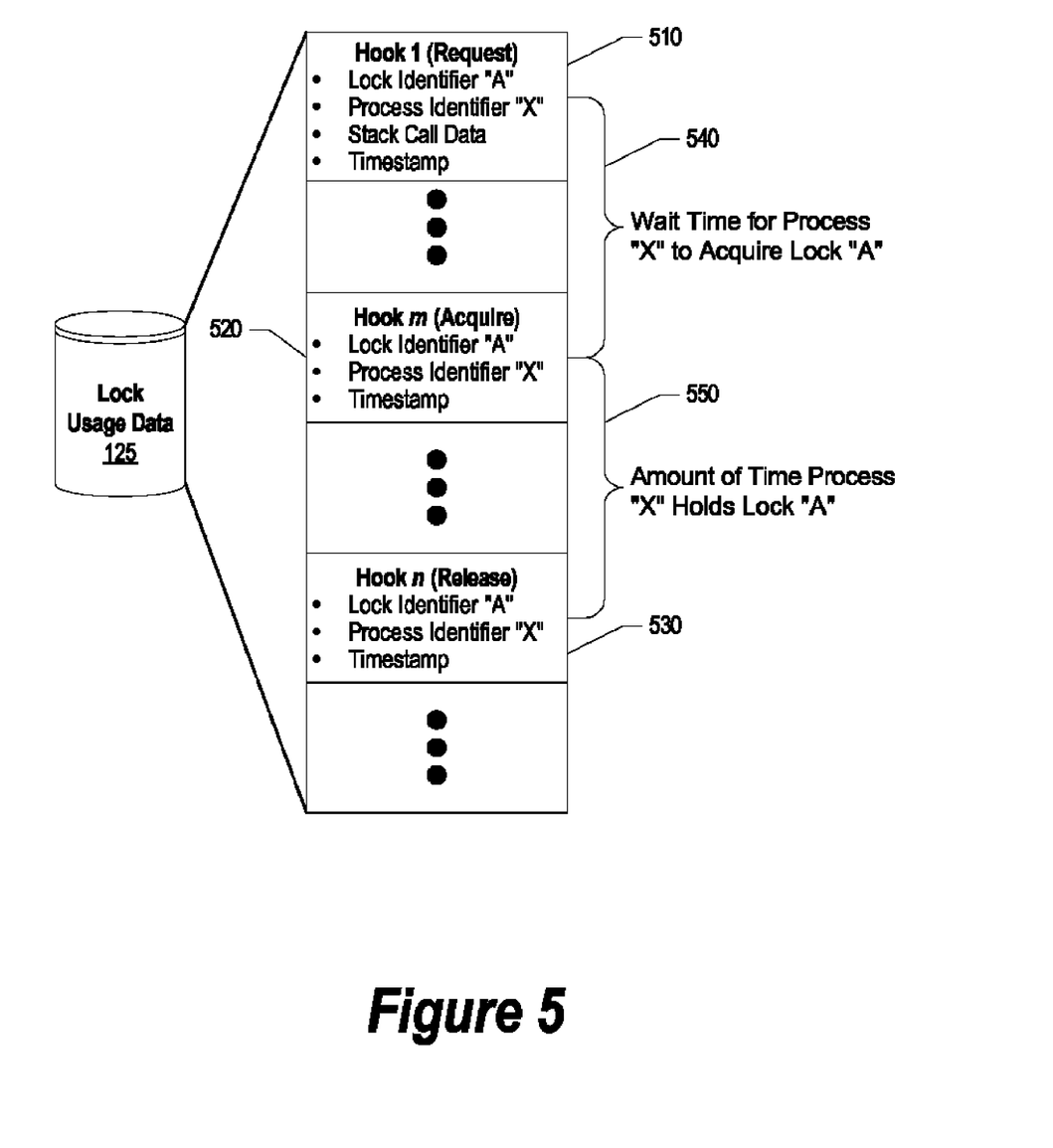
FIG. 5 is a data diagram showing data collected by the operating system's trace hook for analysis by post-operative processing.

FIG. 5 is a data diagram showing data collected by the operating system's trace hook for analysis by post-operative processing. Lock usage data may be a large set of data resulting from numerous trace hooks being emitted for a number of different processes and a number of different locks. For speed efficiency, the trace hook data is written to lock usage data 125 in a sequential manner so that the request, acquisition, and release hook data for a given process might be separated by hook data corresponding to other processes and other locks. FIG. 5 highlights the request, acquisition, and release data for a particular process that was captured by trace hook data and stored in lock usage data 125.

Figure 6:
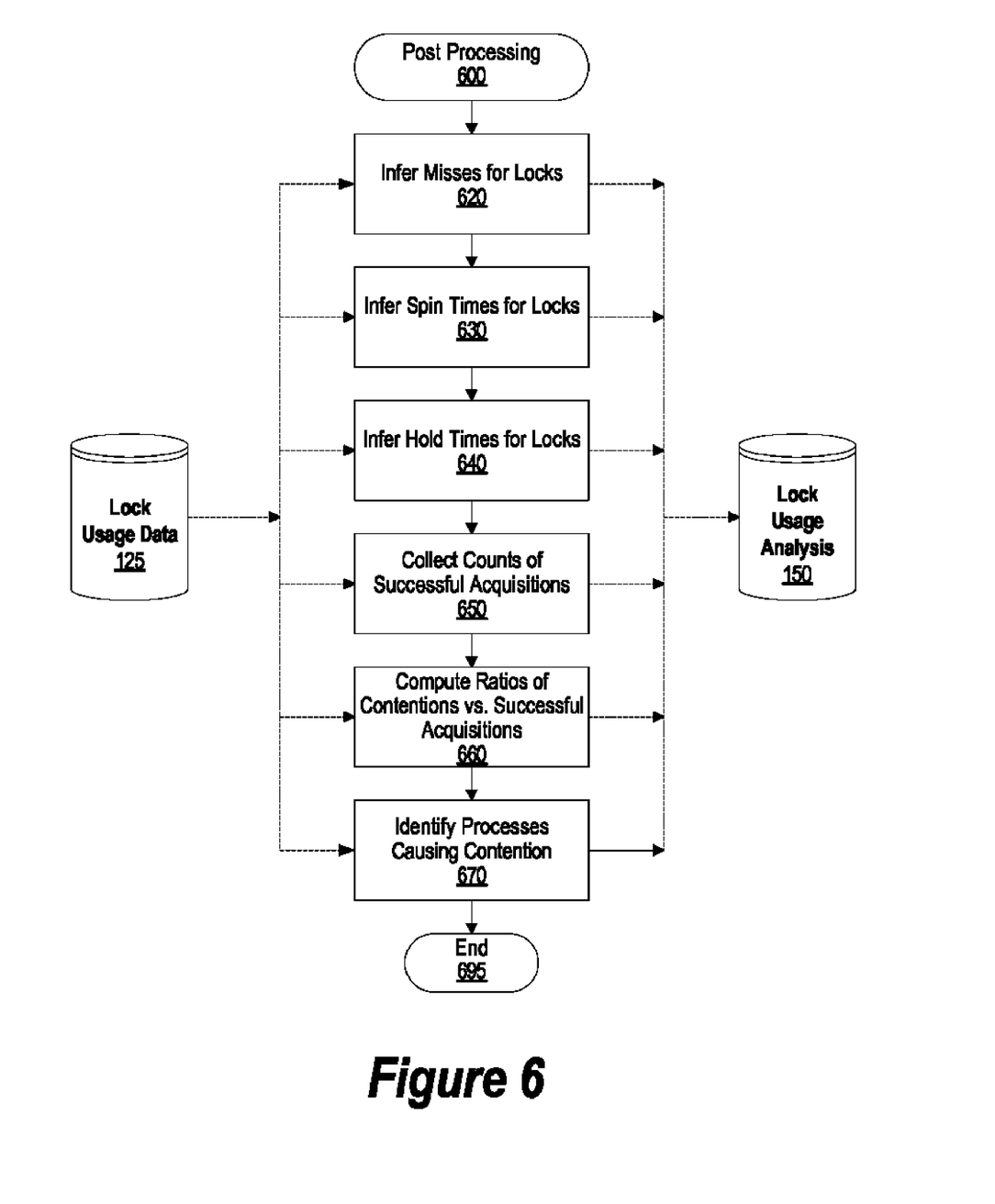
FIG. 6 is a flowchart of post-operative steps taken to analyze lock usage data.

When the lock was requested trace hook data 510 was written to lock usage data 125 (see FIG. 3, step 310). Subsequently, when the process acquired the lock, hook exit code was performed which wrote additional lock acquisition data 520 to the lock usage data (see FIG. 3, step 360). Finally, when the process released the lock, release data 530 was written to lock usage data through another operating system hook trace command (see FIG. 4, step 450). By matching the process and lock identifiers in data 510 with the process and lock identifiers in data 520 and comparing the respective timestamps, wait time 540 can be computed (i.e., the amount of time the process waited before being able to acquire the lock). Likewise, by matching the process and lock identifiers in data 520 with the process and lock identifiers in data 530 and comparing the respective timestamps, hold time 550 can be computed (i.e., the amount of time the process held the lock after acquiring it). A total lock time can also be computed by adding the wait time and the hold time (i.e., the total time from the process' request to the time that the process released the lock). As shown in FIG. 6, the data stored in lock usage data 125 can be analyzed in a number of ways in order to identify processes that are not using locks efficiently as well as understanding bottlenecks occurring in the system when a particular lock or groups of locks is frequently contended.

FIG. 6 is a flowchart of post-operative steps taken to analyze lock usage data. Processing commences at 600 whereupon, at step 620, the number of "misses" for a lock is inferred by comparing the number of hook requests that were written to lock usage data 125 with a counter of the number of times that the lock was requested.

At step 630, the amount of spin (i.e., wait) time for each lock is inferred by comparing the timestamp of processes requesting the lock (see entry 510 in FIG. 5), with the timestamp of the processes when they acquired the lock (see entry 520 in FIG. 5). When the wait times for each process are averaged together for a particular lock, the amount of time spent waiting on a particular lock can be inferred. Likewise, at step 640, the amount of hold time spent for each lock is inferred by comparing the timestamp of processes acquiring the lock (see entry 520 in FIG. 5) with the timestamp of the processes when they release the lock (see entry 530 in FIG. 5).

At step 650, a count of successful acquisitions is made for each lock. This count is made by retrieving the number of times the lock was acquired without waiting for the lock (see step 260 in FIG. 2). In another embodiment, this count is made by subtracting the number of times processes waited for the lock from the total number of times the lock was requested. Similarly, at step 660, the ratio of contended acquisitions versus non-contended acquisitions for each lock is computed. If the ratio is high (i.e., many contended acquisitions in comparison to the number of non-contended acquisitions), then the programmer or system designer can further investigate this lock as a bottleneck location in the system.

At step 670, the processes that are causing contention in the system are identified. If a given either requests a given lock numerous times or holds a given lock for a relatively long period of time, then the identified function can be analyzed to determine whether the function is either calling the lock more than necessary or whether the function is using the lock inefficiently. For example, the function may be requesting the lock before actually needing to use the lock. In addition, the function may not be releasing the lock as soon as processing that actually needs the lock is completed.

Results from the analyses and computations performed in steps 620 through 670 are written to lock usage analysis data store 150. After modifications have been made to functions, more data can be gathered to determine whether the identified functions are more efficient as well as identifying whether bottlenecks in the system have been reduced or eliminated.

Figure 7:
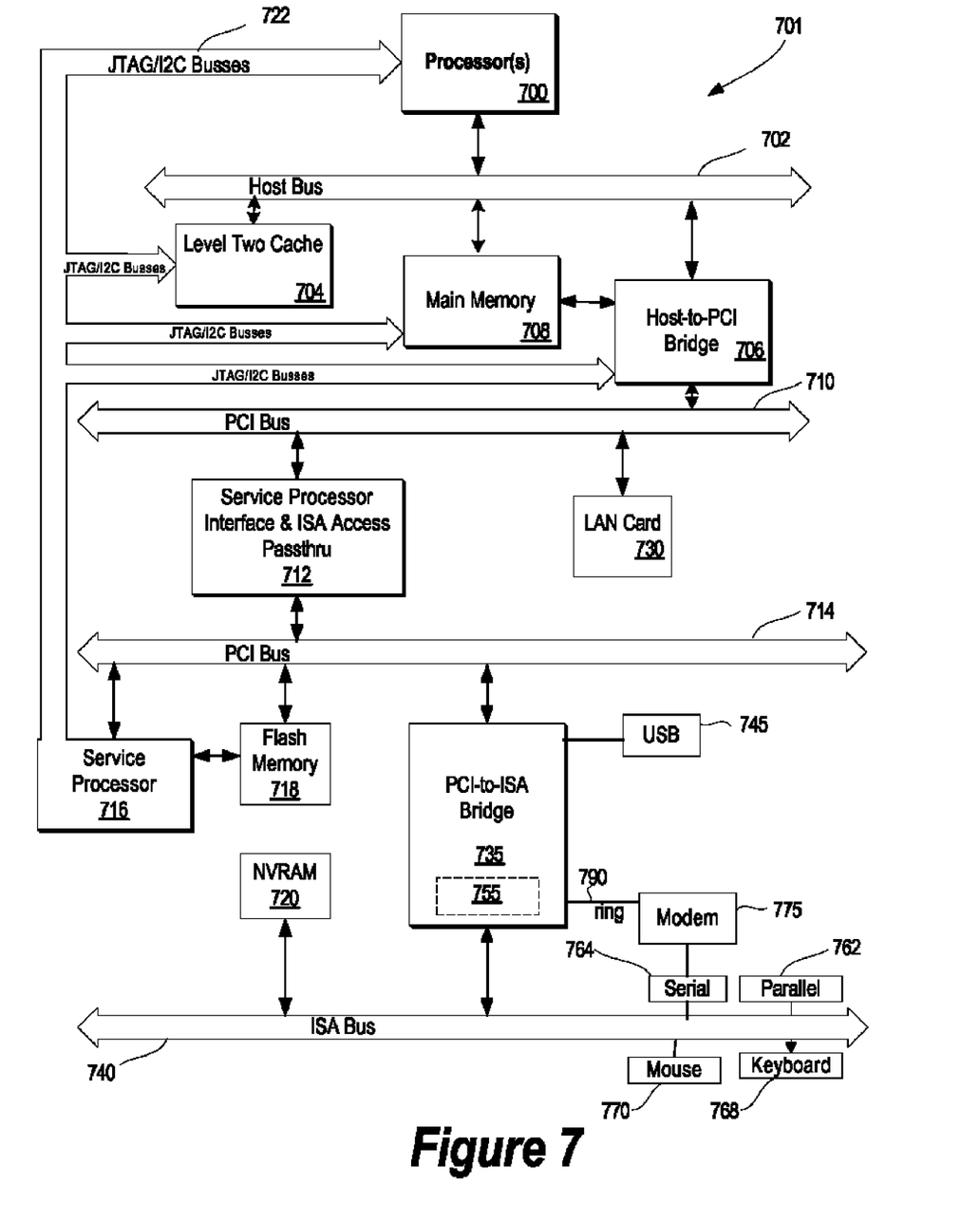
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory accessible by the processors;
   one or more shared resources accessible by the processors;
   a nonvolatile storage device accessible by the processors;
   one or more software locks, stored in the memory, for controlling access to the shared resources;
   an operating system that controls a plurality of processes performed by the processors, the operating system including a trace hook facility; and
   a software lock measurement tool for measuring lock contention, the software lock measurement tool including instructions that, when executed by at least one of the processors, cause the information handling system to perform steps comprising:
      receiving requests from one or more of the processes for one of the shared resources, wherein access to the shared resource is controlled with one of the software locks;
      detecting that the software lock is unavailable;
      executing an operating system trace hook in response to the detecting, wherein the operating system trace hook records lock usage data, wherein the lock usage data includes a timestamp corresponding to each request, a lock address corresponding to an address of the software lock, a stack call chain for each process making one of the requests at the time the corresponding request was made, and a request count; and
      analyzing the recorded lock usage data to identify contended locks and processes that may not be efficiently using software locks.

2. The information handling system of claim 1 wherein the software lock measurement tool includes further instructions that, when executed by at least one of the processors, cause the information handling system to perform further steps comprising:
   receiving a lock release request from a process that currently holds the software lock;
   determining whether other processes are currently waiting for the software lock;
   emitting a second operating system trace hook and releasing the software lock in response to determining that other processes are currently waiting for the software lock, wherein the second operating system trace hook is also adapted to record lock usage data; and
   releasing the software lock without emitting a trace hook in response to determining that other processes are not waiting for the software lock.

3. The information handling system of claim 1 wherein the software lock measurement tool includes further instructions that, when executed by at least one of the processors, cause the information handling system to perform further steps comprising:
   identifying one or more processes causing lock contention in response to the analysis of the lock usage data.

4. The information handling system of claim 1 wherein the software lock measurement tool includes further instructions that, when executed by at least one of the processors, cause the information handling system to perform further steps comprising:
   detecting that the software lock is available in response to receiving the request;
   incrementing a lock counter that tracks the number of times the shared resource was requested; and
   setting ownership of the software lock to an identifier corresponding to an identifier of the requesting process.

5. The information handling system of claim 4 wherein the step of setting ownership further includes:

requesting that a lock ownership field of the software lock be set to the requesting process identifier; and receiving a completion code indicating that the incrementing has been set, wherein the incrementing the lock counter is performed in parallel with the setting ownership by incrementing the lock counter after the request for the lock ownership field has been set and before the completion code has been received.

6. A computer program product stored on a computer storage media that includes instructions that, when executed by an information handling system, measure lock contention by performing steps comprising:

receiving requests for a shared resource, wherein access to the shared resource is controlled with a software lock;

detecting that the software lock is unavailable;

executing an operating system trace hook in response to the detecting, wherein the operating system trace hook records lock usage data, wherein the lock usage data includes a timestamp corresponding to each request, a lock address corresponding to an address of the software lock, a stack call chain for each process making one of the requests at the time the corresponding request was made, and a request count; and analyzing the recorded lock usage data to identify contended locks and processes that may not be efficiently using software locks.

7. The computer program product of claim 6 wherein the instructions, when executed by an information handling system, perform further steps comprising:

receiving a lock release request from a process that currently holds the software lock;

determining whether other processes are currently waiting for the software lock;

emitting a second operating system trace hook and releasing the software lock in response to determining that other processes are currently waiting for the software lock, wherein the second operating system trace hook is also adapted to record lock usage data; and releasing the software lock without emitting a trace hook in response to determining that other processes are not waiting for the software lock.

8. The computer program product of claim 6 wherein the instructions, when executed by an information handling system, perform further steps comprising:

identifying one or more processes causing lock contention in response to the analysis of the lock usage data.

9. The computer program product of claim 8 wherein the instructions, when executed by an information handling system, perform further steps comprising:

modifying the identified processes' usage of the shared resource.

10. The computer program product of claim 6 wherein the instructions, when executed by an information handling system, perform further steps comprising:

detecting that the software lock is available in response to receiving the request;

incrementing a lock counter that tracks the number of times the shared resource was requested; and setting ownership of the software lock to an identifier corresponding to an identifier of the requesting process.

11. The computer program product of claim 10 wherein the step of setting ownership further includes steps comprising:

requesting that a lock ownership field of the software lock be set to the requesting process identifier; and receiving a completion code indicating that the ownership has been set, wherein the incrementing the lock counter is performed in parallel with the setting ownership by incrementing the lock counter after the request for the lock ownership field has been set and before the completion code has been received.

* * * * *